United States Patent
Danowski et al.

(10) Patent No.: US 10,189,400 B2
(45) Date of Patent: Jan. 29, 2019

(54) MOBILE DEVICE TRACKING FOR CONTROL OF VEHICLE SUBSYSTEMS

(71) Applicant: Ford Global Technologies, LLC, Dearborn, MI (US)

(72) Inventors: Christopher Anthony Danowski, Rochester, MI (US); Paul Kenneth Dellock, Northville, MI (US); Pietro Buttolo, Dearborn Heights, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/231,533

(22) Filed: Aug. 8, 2016

(65) Prior Publication Data

US 2018/0037155 A1    Feb. 8, 2018

(51) Int. Cl.
  *B60Q 1/26*  (2006.01)
  *E05F 15/74* (2015.01)
  *G07C 9/00*  (2006.01)

(52) U.S. Cl.
  CPC ............ *B60Q 1/26* (2013.01); *B60Q 1/2696* (2013.01); *E05F 15/74* (2015.01); *G07C 9/00309* (2013.01); *E05Y 2400/45* (2013.01); *E05Y 2900/531* (2013.01); *G07C 2009/00769* (2013.01); *G07C 2209/63* (2013.01)

(58) Field of Classification Search
  None
  See application file for complete search history.

(56) References Cited

U.S. PATENT DOCUMENTS

| 8,126,450 | B2 * | 2/2012  | Howarter ........... B60R 25/2009 455/420 |
| 9,123,244 | B2   | 9/2015  | Daman et al. |
| 9,173,087 | B2   | 10/2015 | Pallotta |
| 9,194,168 | B1 * | 11/2015 | Lu ........................ E05F 15/70 |
| 9,442,888 | B2 * | 9/2016  | Stanfield ............... G08G 1/20 |

(Continued)

FOREIGN PATENT DOCUMENTS

| CN | 105270224 A   | 1/1916  |
| EP | 2384936 A1    | 11/2011 |

(Continued)

OTHER PUBLICATIONS

Malhorta et al., Location Estimation in Ad-Hoc Networks with Directional Antennas, Proceedings of the 25th IEEE International Conference on Distributed Computing Systems (2005).*

(Continued)

*Primary Examiner* — Redhwan K Mawari
*Assistant Examiner* — Edward Torchinsky
(74) *Attorney, Agent, or Firm* — James P. Muraff; Neal, Gerber & Eisenberg LLP

(57) ABSTRACT

Apparatus and methods are disclosed for mobile device tracking for control of vehicle subsystems. An example disclosed vehicle includes light panels embedded in the vehicle, wireless nodes, and an auxiliary body control module. The example auxiliary body control module, when a speed of the vehicle is less than a threshold speed, monitors a distance between a wireless device and the vehicle. In response to the distance satisfying a range threshold, the auxiliary body control module activates the light panels.

14 Claims, 5 Drawing Sheets

(56) References Cited

U.S. PATENT DOCUMENTS

| | | |
|---|---|---|
| 2004/0104815 A1 | 6/2004 | Suyama et al. |
| 2005/0007789 A1 | 1/2005 | Schenk |
| 2005/0258980 A1 | 11/2005 | Conover |
| 2006/0046684 A1 | 3/2006 | Kameyama |
| 2010/0075656 A1 | 3/2010 | Howarter et al. |
| 2012/0232749 A1 | 9/2012 | Schoenberg et al. |
| 2016/0105762 A1 | 4/2016 | Singh et al. |
| 2017/0213165 A1* | 7/2017 | Stauffer ................ G06Q 10/02 |

FOREIGN PATENT DOCUMENTS

| | | |
|---|---|---|
| JP | 2009179998 A | 8/2009 |
| WO | WO 201574098 A1 | 5/2015 |

OTHER PUBLICATIONS

*Voxx Sensor Tech Tethers You Via Bluetooth to Your Car's Baby Seat*, Jan. 2015, 3 Pages.
Search Report dated Feb. 1, 2018 for Great Britain Patent Application No. GB 1712437.1 (5 Pages).

* cited by examiner

MOBILE DEVICE TRACKING FOR CONTROL OF VEHICLE SUBSYSTEMS

TECHNICAL FIELD

The present disclosure generally relates to wireless interaction between a vehicle and mobile device and, more specifically, mobile device tracking for control of vehicle subsystems.

BACKGROUND

In situations where a large number of vehicles are stopped, any one particular vehicle may be hard to visually locate. For example, after school, vehicles may be parked in front of a school. Another example is cars parked in a crowded parking lot. Strictly audible alerts may not be enough to locate a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for mobile device tracking for control of vehicle subsystems. An example disclosed vehicle includes light panels embedded in the vehicle, wireless nodes, and an auxiliary body control module. The example auxiliary body control module, when a speed of the vehicle is less than a threshold speed, monitors a distance between a wireless device and the vehicle. In response to the distance satisfying a range threshold, the auxiliary body control module activates the light panels.

An example disclosed vehicle includes wireless nodes, a sliding door, and an auxiliary body control module. The example auxiliary body control module monitors a first distance from the vehicle of a first wireless device. When the first wireless device is within a first range threshold of the vehicle, the example auxiliary body control module monitors a second distance from the vehicle of a second wireless device. When the second wireless device is within a second range threshold of the vehicle, the example auxiliary body control module opens the sliding door.

An example disclosed vehicle includes wireless nodes, light panels embedded in the vehicle, a sliding door; and an auxiliary body control module. The example body control module monitors, via the wireless nodes, a first distance between a first wireless device and the vehicle and a second distance between a second wireless device and the vehicle. The example body control module also, in response to the first distance satisfying a first range threshold, activates the light panels. Additionally, when the second wireless device is within a second range threshold and first wireless device is within a third range threshold of the vehicle, the example body control module opens the sliding door. The third range threshold is closer to the vehicle than the first range threshold. When the first wireless device inside the vehicle, the example body control module closes the sliding door.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
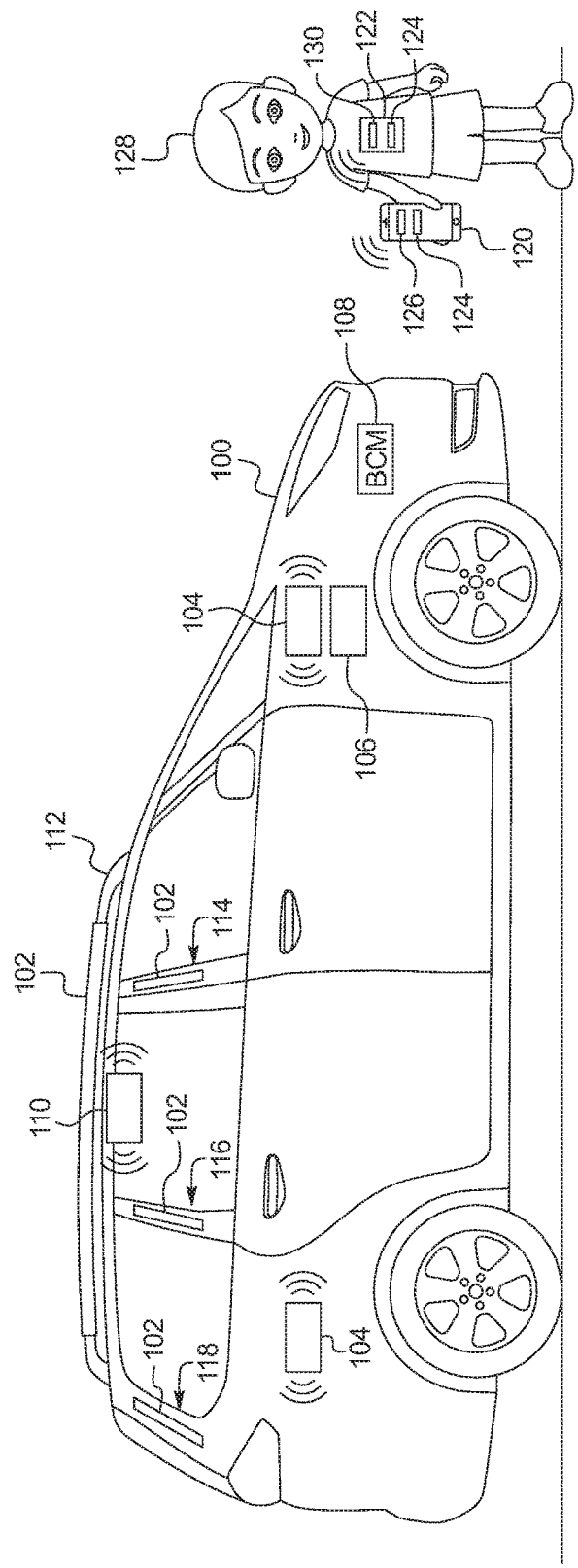
FIG. 1 is a diagram of a vehicle operating in accordance with the teaching of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Some individuals, such as children, may have a hard time locating a particular vehicle from amongst an area crowded with vehicles. Additionally, some individuals often leave items in the vehicle, and therefore, it is desirable to facilitate access to the vehicle under a variety of circumstances. As disclosed below, a vehicle includes light panels positioned to be seen from a distance. For example, the light panels may be attached to or embedded on a roof rack on top of the vehicle. An individual carries a wireless network enabled device, such as a mobile device (e.g., a smart phone, a smart watch, a tablet, a portable gaming system, etc.) or a tracking tag. The tracking tag is an object configured to attach to clothes of the individual. When the vehicle is under a threshold speed, the vehicle tracks the location of the wireless network enabled device via wireless nodes positioned around the vehicle. When the wireless network enabled device is within a threshold range of the vehicle, the light panels are activated. In some examples, the color and pattern of the light emitted from the light panels is configurable. For example, the light emitted from the light panel may alternative between blue and yellow every second. When the wireless network enabled device is within a closer range threshold, the vehicle automatically opens one of the doors if another mobile device associated with an owner or driver of the vehicle is in the vicinity. For example, the person with the wireless network enabled device may access the vehicle to retrieve an item, such as a baseball glove, when the driver is nearby, but not actively unlocking the door. In some examples, the vehicle automatically shuts the door when the wireless network enabled device is inside the vehicle for a threshold amount of time.

FIG. 1 is a diagram of a vehicle 100 operating in accordance with the teaching of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. Additionally, the vehicle 100 may be non-autonomous, semi-autonomous or autonomous. In the illustrated example, the vehicle 100 includes light panels 102, wireless nodes 104, a speed sensor 106, a body control module 108, and an auxiliary body control module 110.

The light panels 102 include light emitting diodes (LEDs) that are electrically coupled to the auxiliary body control module 110. The light panels are embedded in elevated locations in the vehicle 100. In the illustrated example, the light panels 102 are embedded into a roof rack 112 and/or one or more of B pillars 114, C pillars 116, and D pillars 118. In some examples, the light panels 102 include multiple LED pixels. An LED pixel is a grouping of LEDs of different colors (such as red, green and blue) with each LED in the pixel having a configurable intensity. By varying the intensity of the different LEDs, the pixel changes color. In such examples, the color of light emitted by the light panel 102 is configurable. Additionally, the light panel 102 is configuration to emit light from the LEDs in patterns. For example, the light panel 102 may flash or LEDs in the light panel may light in a particular order, etc. In some such examples, the color and/or pattern of light emitted by the light panel 102 is configured via an infotainment head unit (e.g., the infotainment head unit 302 of FIG. 3 below).

The wireless nodes 104 are positioned around the vehicle 100. The wireless nodes 104 are used determines a distance between the vehicles and a mobile device 120 (e.g., a smart phone, a smart watch, a tablet, a portable gaming device, etc.) or a tracking tag 122. In some examples, the wireless nodes 104 are embedded into the chassis of the vehicle 100. Alternatively, the wireless nodes 104 may be battery-power detachable units. In the illustrated example, the wireless nodes 104 are proximate the lower portion of windows of the vehicle 100. Alternatively, in some examples, the wireless nodes 104 are in an elevated position. The wireless nodes 104 include hardware and firmware to implement a short-range wireless network, such as Bluetooth Low Energy (BLE). The BLE protocol is set forth in Volume 6 of the Bluetooth Specification 4.0 (and subsequent revisions) maintained by the Bluetooth Special Interest Group. In some examples, the wireless nodes 104 include multidirectional antennas. Alternatively or additionally, in some examples, the wireless nodes 104 include directional antennas. The range for wireless nodes 104 with multi-directional antenna may be 10 meters (33 feet) and the range for wireless nodes 104 with directional antenna may be 50 meters (164 feet).

Messages exchanged between the wireless nodes 104 and the mobile device 120 or tracking tag 122 include the RSSI and/or the RX between the wireless nodes 104 and the mobile device 120 or the tracking tag 122. The RSSI and RX values measure the open-path signal strength that the one of the wireless nodes 104 detects from the corresponding mobile device 120 or the corresponding tracking tag 122. The RSSI is measured in signal strength percentage, the values (e.g., 0-100, 0-137, etc.) of which are defined by a manufacturer of hardware used to implement the wireless node 104. Generally, a higher RSSI means that the mobile device 120 or the tracking tag 122 is closer to the corresponding wireless node 104. The RX values are measured in Decibel-milliWatts (dBm). For example, when the mobile device 120 or the tracking tag 122 is one meter (3.28 feet) away, the RX value may be −60 dBm, and when the mobile device 120 or the tracking tag 122 is two meters (6.56 feet) away, the RX value may be −66 dBm. The RSSI/RX values are used to determine the distance from the mobile device 120 or the tracking tag 122 to the wireless nodes. In some examples, when the two or more wireless nodes detect the mobile device 120 or the tracking tag 122, the location and distance of the corresponding the mobile device 120 or the tracking tag 122 may be determined relative to the vehicle 100.

The mobile device 120 and the tracking tag 122 include a wireless node 124 that may be paired with the wireless nodes 104 of the vehicle 100. The wireless node 124 of the mobile device 120 and the tracking tag 122 is paired with the wireless nodes 104 of the vehicle 100 during an initial setup via the infotainment head unit. In some examples, the mobile device 120 and the tracking tag 122 includes a haptic feedback device that vibrates the device 120 and 122 when it is within a certain distance of the vehicle 100. In some examples, the mobile device 120 includes an application 126 that, when the mobile device 120 is within a certain distance of the vehicle 100, changes the color of the screen of the mobile device 120 to match the color of the light panels 102. The tracking tag 122 tag is configured to attach to clothing and/or belonging of a person 128 (e.g., a child, etc.) Additionally, in some examples, the tracking tag 122 includes an LED pixel 130 that, when the tracking tag 122 is within a certain distance of the vehicle 100, changes color to match the color of the light panels 102.

The speed sensor 106 is positioned in the vehicle 100 to measure the speed of the vehicle 100. In some examples, the speed sensor 106 may include one or more wheel speed sensors and/or an axel speed sensor.

The body control module 108 controls various subsystems of the vehicle 100. For example, the body control module 108 may control power windows, power locks, an immobilizer system, and/or power mirrors, etc. The body control module 108 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control module 108 is communicatively coupled to input controls within the vehicle 100, such as power window control buttons, power lock buttons, etc. The body control module 108 instructs the subsystem to act based on the corresponding to the actuated input control. For example, if the driver's side window button is toggled to lower the driver's side window, the body control module 108 instructs the actuator controlling the position of the driver's side window to lower the window. In some examples, the body control module 108 is communicatively coupled (e.g., via a wireless connection) to the auxiliary body control module 110. For example, the body control module 108 may open and close a sliding door (e.g., the sliding door 206 of FIG. 2 below) of the vehicle 100 when requested by the auxiliary body control module 110.

In the illustrated example, the auxiliary body control module 110 tracks, via the wireless nodes 104, the person 128 via the mobile device 120 or the tracking tag 122. The example auxiliary body control module 110 includes hardware and firmware to implement a short-range wireless network, such as Bluetooth Low Energy (BLE). The auxiliary body control module 110 is wirelessly communicatively coupled to the wireless nodes 104 of the vehicle 100. Additionally, the auxiliary body control module 110 controls the light panels 102. In some examples, the auxiliary body control module 110 is incorporated into the body control module 108. Alternatively, in some examples, the auxiliary body control module 110 in communicatively coupled to the body control module 108 and issues commands for the body control module 108 to control various subsystems of the vehicle 100, such as the doors. Alternatively, in some examples, the auxiliary body control module 110 includes circuits to control the doors of the vehicle 100.

In the illustrated example of FIG. 1, the auxiliary body control module 110 monitors the speed of the vehicle 100 via the speed sensor 106. When the vehicle satisfies (e.g., is less than) a threshold speed (e.g., five miles per hour, ten miles per hour, etc.), the auxiliary body control module 110 controls the light panels 102 of the vehicle 100 based on the distance of the person 128 from the vehicle 100. When the person is within a threshold range (e.g., fifty feet, seventy-five feet, etc.), the auxiliary body control module 110 activates the light panels 102. In some examples, the auxiliary body control module 110 controls the color and/or the pattern of the light panel 102 based on settings input into the infotainment head unit. In some examples, the auxiliary body control module 110 sends instructions to the device 120 and 122 being tracked to provide an audio, visual, and/or haptic notification that the vehicle 100 is in the vicinity. Additionally, in some such examples, the instruction causes the display of the mobile device 120 of the LED pixel 130 of the tracking tag 122 to display a color that matches the color of the light panels 102.

Figure 2:
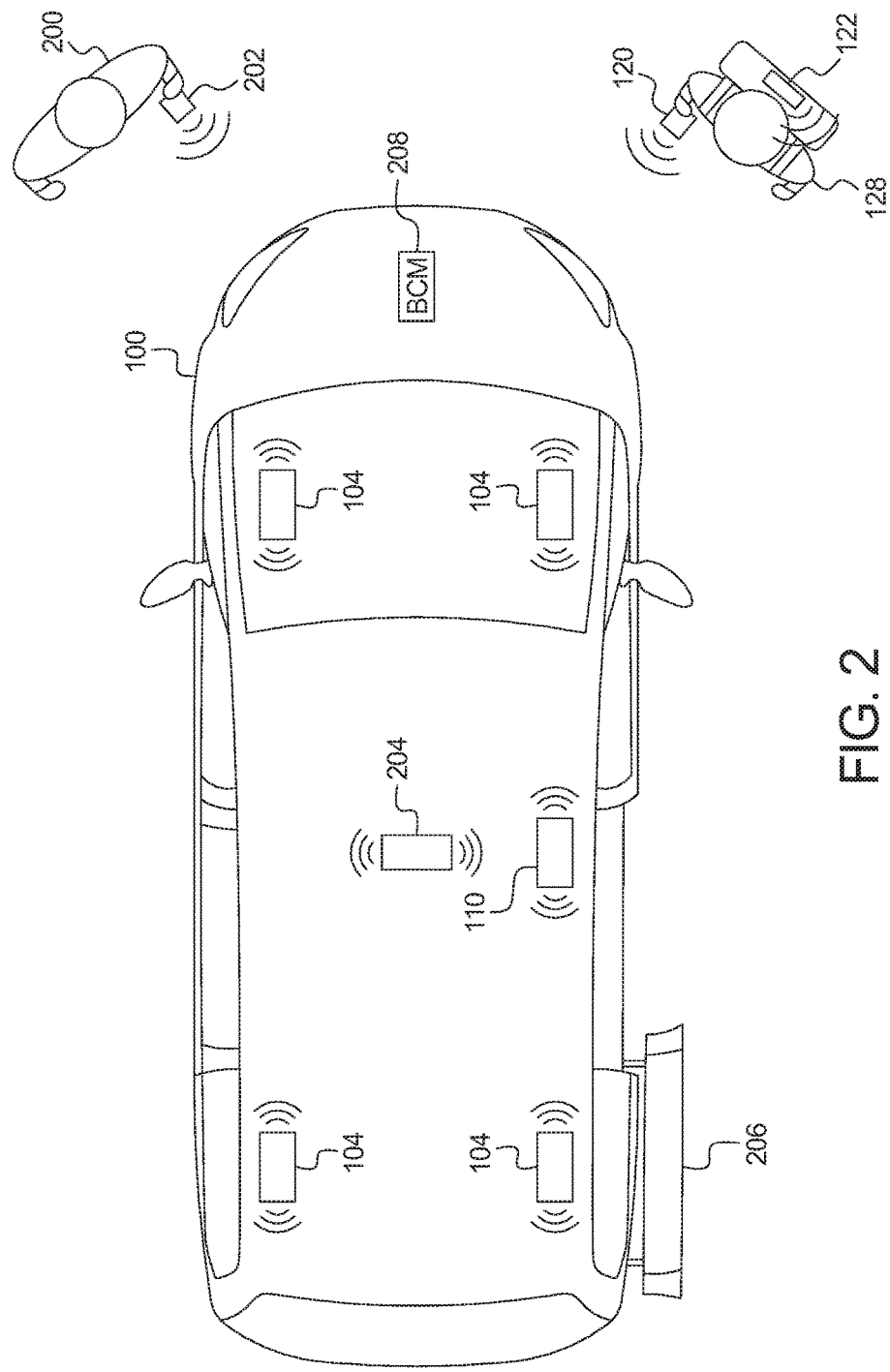
FIG. 2 is a diagram of a vehicle tracking a location of a mobile device.

In the illustrated example of FIG. 2, the auxiliary body control module 110 monitors (a) a first distance from the vehicle 100 of the person 128 via the mobile device 120 or the tracking tag 122, and (b) a second distance from the vehicle 100 of another person 200 associated with the vehicle 100 (e.g., the driver, the owner, etc.) via a mobile device 202 of the person. Additionally, in the illustrated example, the vehicle 100 includes an interior wireless node 204. Based on the differences in signal strength and relative location from the wireless nodes 104 and 204 to the mobile device 120 or the tracking tag 122, the auxiliary body control module 110 determines when the person 128 is located inside or outside the vehicle 100. When the person 200 associated with the vehicle 100 is within a threshold distance (e.g., twenty-five feet, fifty-feet, etc.) from the vehicle 100, the auxiliary body control module 110 controls a door 206 of the vehicle 100 based on the first distance and location of the person 128. When first distance of the person 128 is within a distance threshold (e.g., five feet, ten feet, etc.), the auxiliary body control module 110 unlocks the door 206. Additionally, in some examples, the auxiliary body control module 110 causes the door 206 to open. Subsequently, when the auxiliary body control module 110 detects that the person 128 is inside the vehicle 100 for a period of time (e.g., thirty seconds, one minute, five minutes, etc.), the auxiliary body control module 110 causes the door 206 to close.

Figure 3:
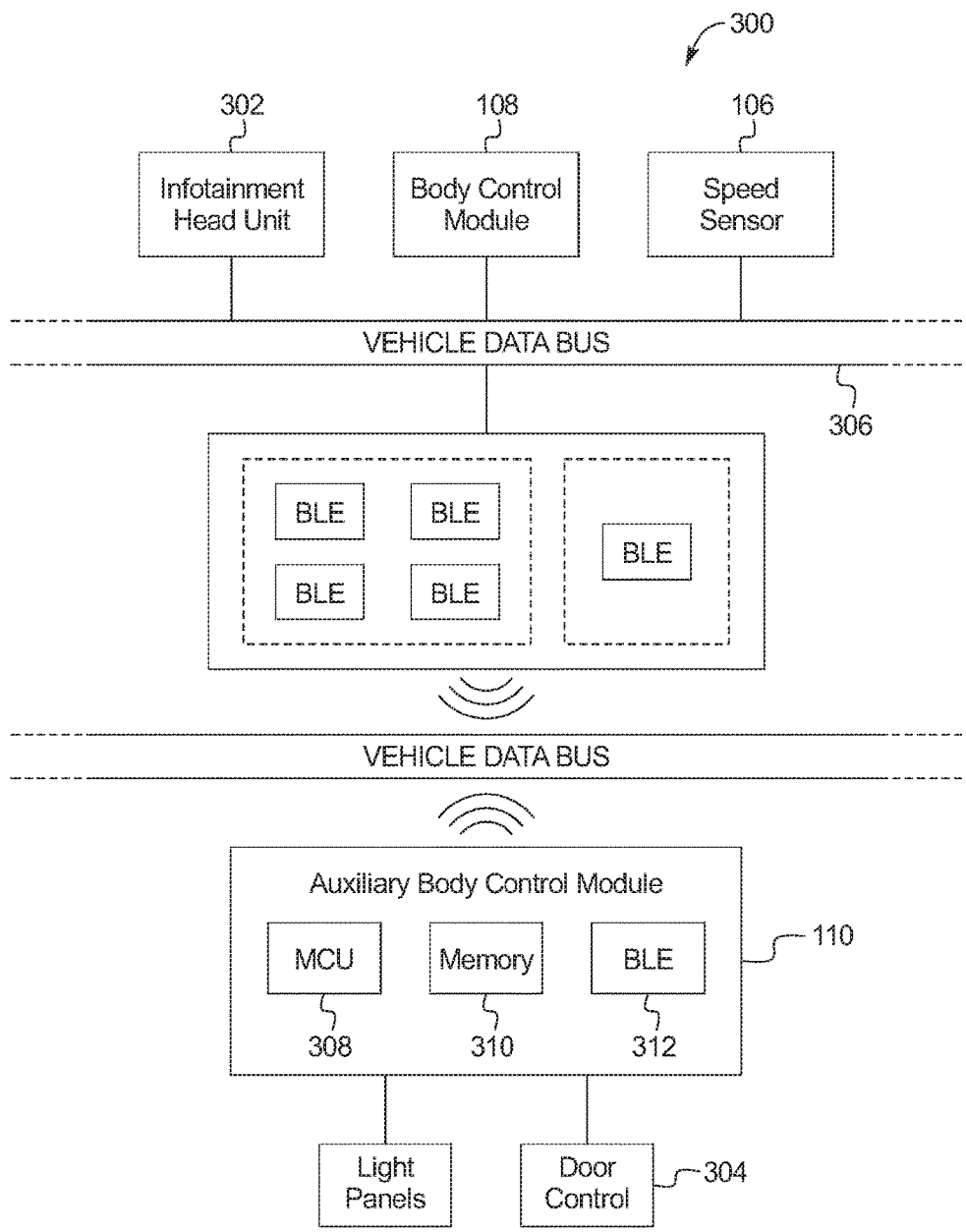
FIG. 3 is a block diagram of electronic components of the vehicle of FIGS. 1 and 2.

FIG. 3 is a block diagram of electronic components 300 of the vehicle 100 of FIGS. 1 and 2. In the illustrated example, the electronic components 300 include the speed sensor 106, the body control module 108, an infotainment head unit 302, the wireless nodes 104 and 204, the auxiliary body control module 110, the light panels 102, a door controller 304, and a vehicle data bus 306. The door controller 304 controls the door 206 of the vehicle 100. In some example, when activated, the door controller 304 opens and closes the door 206 without intervention from the persons 128 and 200.

The infotainment head unit 302 provides an interface between the vehicle 100 and a user (e.g., a driver, a passenger, etc.). The infotainment head unit 302 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the infotainment head unit 302 includes hardware (e.g., a processor or controller, memory, storage, etc.) and software (e.g., an operating system, etc.) for an infotainment system that is displayed on, for example, the center console display. An application executing on the infotainment system may be used to configure the color and pattern of the light panels 102.

In the illustrated example, the auxiliary body control module 110 includes a processor or controller 308, memory 310, and a wireless node 312. The processor or controller 308 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 310 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 310 includes multiple kinds of memory, particularly volatile memory and non-volatile memory.

The memory 310 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 310, the computer readable medium, and/or within the processor 308 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle data bus 306 communicatively couples the speed sensor 106, the body control module 108, the infotainment head unit 302, and the wireless nodes 104 and 204. In some examples, the vehicle data bus 306 includes one or more data buses. The vehicle data bus 306 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet™ bus protocol IEEE 802.3 (2002 onwards), etc.

Figure 4:
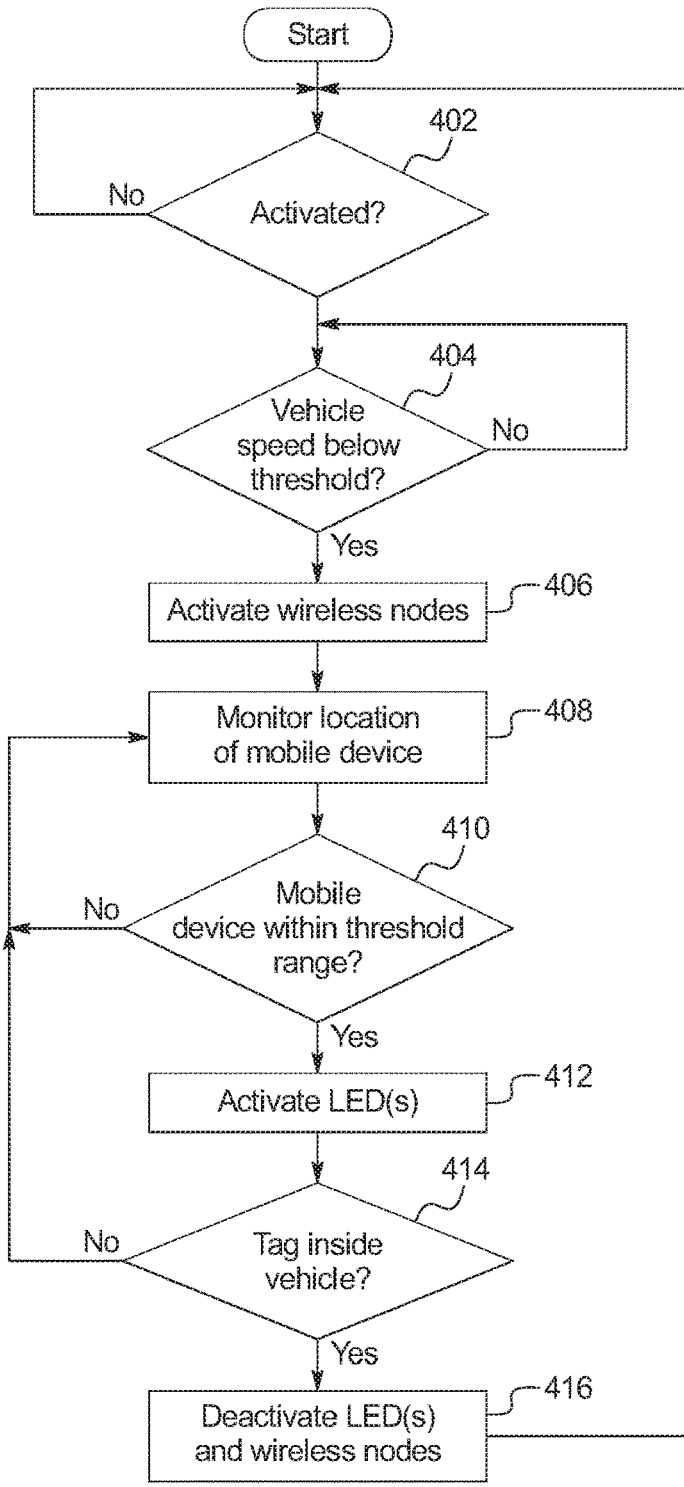
FIG. 4 is a flowchart of a method to operate lights of the vehicle of FIGS. 1 and 2 that may be implemented by the electronic components of FIG. 3.

FIG. 4 is a flowchart of a method to operate the light panels 102 of the vehicle 100 of FIGS. 1 and 2 that may be implemented by the electronic components 300 of FIG. 3. Initially, at block 402, the auxiliary body control module 110 waits until it has been activated. In some example, the auxiliary body control module 110 is activated via the infotainment system of the infotainment head unit 302. At block 404, the auxiliary body control module 110 waits unit the vehicle 100 is below a speed threshold. When the vehicle 100 below the speed threshold, at block 406, the auxiliary body control module 110 activates the wireless nodes 104. At block 408, the auxiliary body control module 110 monitors the distance of the mobile device 120 or the tracking tag 122 from the vehicle 100. At block 410, the auxiliary body control module 110 determines whether the distance between the devices 120 and 122 and the vehicle 100 satisfies (e.g., is less than) a threshold range. If the distance between the devices 120 and 122 and the vehicle 100 satisfies the threshold range, the method continues at block 412. Otherwise, if the distance between the devices 120 and 122 and the vehicle 100 does not satisfy the threshold range, the method returns to block 412.

At block 412, the auxiliary body control module 110 activates the light panels 102. In some examples, the auxiliary body control module 110 activates the light panels 102 in accordance with a color and/or a pattern setting. In some examples, the auxiliary body control module 110 sends a message, via the wireless node 124, to cause the devices 120 and 122 to provide an audio, visual and/or haptic alert. For example, the message may cause the screen of the mobile device 120 to display the color of the light panels 102, or the LED pixel 130 of the tracking tag 122 to change to match the color of the light panels 102. At block 414, the auxiliary body control module 110 determines whether the device 120 and 122 is inside the vehicle 100. If the the device 120 and 122 is inside the vehicle 100, the method continues to block 416. Otherwise, if the device 120 and 122 is not inside the vehicle 100, the method returns to block 412. At block 416, the auxiliary body control module 110 deactivates the light panels 102.

Figure 5:
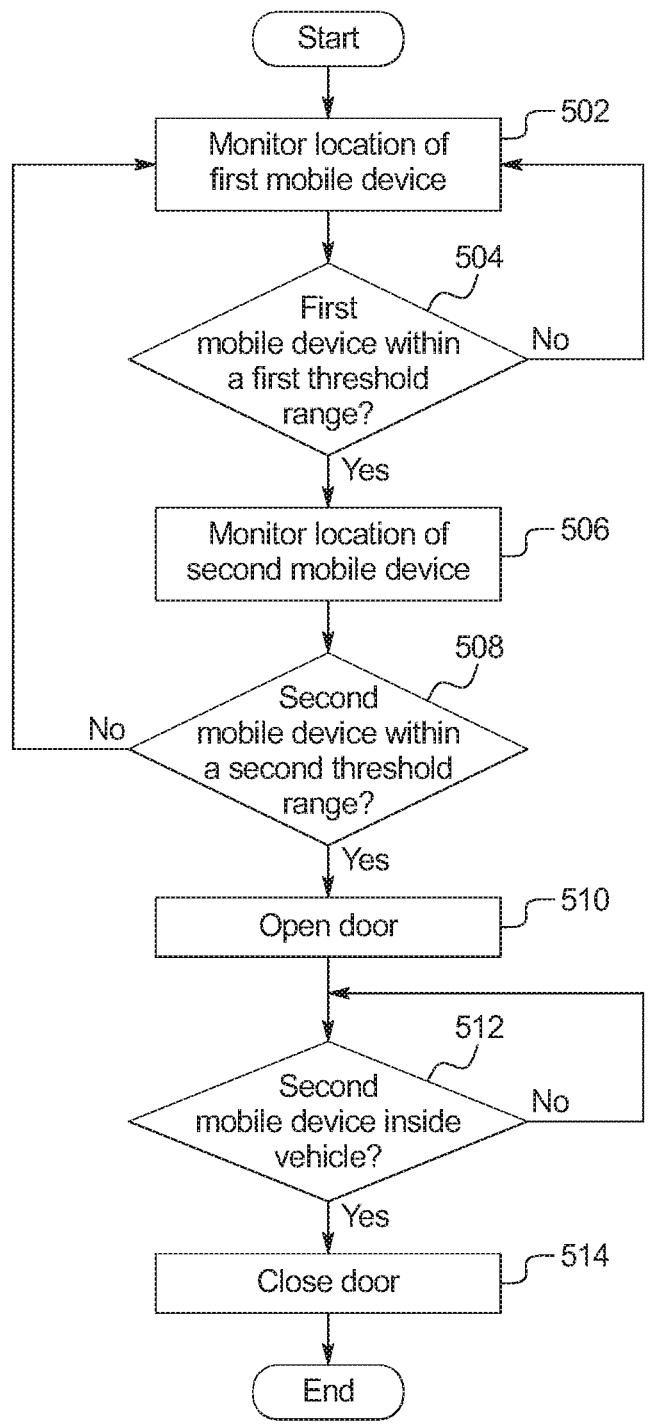
FIG. 5 is a flowchart of a method to operate a door of the vehicle of FIGS. 1 and 2 that may be implemented by the electronic components of FIG. 3.

FIG. 5 is a flowchart of a method to operate a door 206 of the vehicle 100 of FIGS. 1 and 2 that may be implemented by the electronic components 300 of FIG. 3. Initially, at block 502, the auxiliary body control module 110 monitors the distance of the first mobile device 202 from the vehicle 100. At block 504, the auxiliary body control module 110 determines whether the first mobile device 202 is within a first threshold range (e.g., twenty-five feet, thirty feet, etc.) of the vehicle 100. If the first mobile device 202 is within the first threshold range, the method continues at block 506. Otherwise, if the first mobile device 202 is not within the first threshold range, the method returns to block 502. At block 506, the auxiliary body control module 110 monitors the distance from the vehicle 100 of the second mobile device 120 or the tracking tag 122.

At block 508, the auxiliary body control module 110 determines whether the second mobile device 120 or tracking tag 122 is within a second threshold range (e.g., five feet, ten feet, etc.) of the vehicle 100. If the second mobile device 120 or tracking tag 122 is within the second threshold range, the method continues at block 510. Otherwise, if the second mobile device 120 or tracking tag 122 is not within the second threshold range, the method returns to block 502. At block 510, the auxiliary body control module 110 opens a door 206 of the vehicle 100. In some examples, the door 206 is a sliding door. At block 512, the auxiliary body control module 110 waits unit the second mobile device 120 or tracking tag 122 is inside the vehicle 100. At block 512, the auxiliary body control module 110 closes the door 206.

The flowchart of FIGS. 4 and 5 are methods that may be implemented by machine readable instructions that comprise one or more programs that, when executed by a processor (such as the processor 308 of FIG. 3), implement the auxiliary body control module 110 of FIGS. 1, 2 and 3. Further, although the example program(s) is/are described with reference to the flowcharts illustrated in FIGS. 4 and 5, many other methods of implementing the example the auxiliary body control module 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. As used herein, the term "attached to" means "attached to or embedded in."

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:
1. A vehicle comprising:
light panels attached to the vehicle;
wireless nodes; and
an auxiliary body control module to:
when a speed of the vehicle is less than a threshold speed, monitor, via the wireless nodes, a distance between a tracking tag and the vehicle, the tracking tag configured to attach to an article of clothing that includes an LED pixel; and
in response to the distance satisfying a range threshold, activate the light panels and the LED pixel of the tracking tag.
2. The vehicle of claim 1, wherein the light panels include LED pixels.
3. The vehicle of claim 1, wherein a color and a pattern produced by the light panels are configurable.
4. The vehicle of claim 1, therein the light panels are attached to at least one of a roof rack, a B panel, a C panel, or a D panel.
5. The vehicle of claim 1, wherein the wireless nodes include directional antennas.
6. The vehicle of claim 5, wherein the message causes the LED pixel of the tracking tag to match a color of the light panels.

7. A vehicle including:
a sliding door; and
an auxiliary body control module to:
monitor, with wireless nodes, a first distance from the vehicle to a first wireless device;
when the first wireless device is within a first range threshold of the vehicle, monitor a second distance from the vehicle to a second wireless device; and
when the second wireless device is within a second range threshold of the vehicle, open the sliding door.

8. The vehicle of claim 7, wherein the wireless nodes include directional antennas.

9. The vehicle of claim 7, wherein the auxiliary body control module is to, when the second wireless device inside the vehicle, close the sliding door.

10. The vehicle of claim 7, wherein the second range threshold is closer to the vehicle than the first range threshold.

11. The vehicle of claim 7, wherein the second range threshold is five feet.

12. The vehicle of claim 7, wherein the second wireless device is a tracking tag affixed to an item associated with a person to be tracked.

13. The vehicle of claim 7, wherein the auxiliary body control module is communicatively coupled, via a wireless connection, to a body control module of the vehicle.

14. A vehicle comprising:
wireless nodes;
light panels attached to the vehicle;
a sliding door; and
an auxiliary body control module to:
monitor, via the wireless nodes, a first distance between a first wireless device and the vehicle and a second distance between a second wireless device and the vehicle;
in response to the first distance satisfying a first range threshold, activate the light panels;
when the second wireless device is within a second range threshold and the first wireless device is within a third range threshold of the vehicle, open the sliding door, the third range threshold closer to the vehicle than the first range threshold; and
when the first wireless device is inside the vehicle, close the sliding door.

* * * * *